United States Patent [19]

Hagmanns

[11] Patent Number: 5,633,860
[45] Date of Patent: May 27, 1997

[54] RELIABLITY-CONTROLLED DATA RECEPTION IN RECEIVERS FOR TDMA MOBILE RADIO SYSTEMS

[75] Inventor: Franz-Josef Hagmanns, Backnang, Germany

[73] Assignee: ANT Nachrichtentechnik GmbH, Stuttgart, Germany

[21] Appl. No.: 507,475

[22] PCT Filed: Mar. 19, 1994

[86] PCT No.: PCT/DE94/00308

§ 371 Date: Aug. 28, 1995

§ 102(e) Date: Aug. 28, 1995

[87] PCT Pub. No.: WO94/24799

PCT Pub. Date: Oct. 27, 1994

[30]  Foreign Application Priority Data

Apr. 8, 1993 [DE] Germany .................. 43 11 604.3

[51] Int. Cl.$^6$ ............................................. H04L 25/30
[52] U.S. Cl. ...................... 370/252; 370/522; 375/224; 375/231
[58] Field of Search ................. 370/13, 17, 95.3, 370/98, 110.1; 375/224, 227, 231, 232; 455/67.1, 67.4

[56]  References Cited

U.S. PATENT DOCUMENTS

| | | | |
|---|---|---|---|
| 5,257,265 | 10/1993 | Su et al. ............................. | 370/100.1 |
| 5,303,226 | 4/1994 | Okanoue et al. ................... | 375/231 |
| 5,400,362 | 3/1995 | Chennakeshu et al. ........... | 370/95.3 |
| 5,414,734 | 5/1995 | Marchetto et al. ................. | 375/267 |
| 5,465,276 | 11/1995 | Larsson et al. ..................... | 375/346 |
| 5,473,632 | 12/1995 | Riedel et al. ....................... | 370/17 |

FOREIGN PATENT DOCUMENTS

| | | |
|---|---|---|
| 0520969 | 12/1992 | European Pat. Off. . |
| 0524597 | 1/1993 | European Pat. Off. . |
| 3908942 | 9/1990 | Germany . |
| 94/24798 | 10/1994 | WIPO . |
| 94/24796 | 10/1994 | WIPO . |

OTHER PUBLICATIONS

Morgül et al. : "New optimum recursive parameter estimation/detection using unreliable erasure declaring detectors". In: Fifth European Signal Processing Conf., pp. 225–228.

S. Crozier et al. : "Short–Block equalization Techniques Employing Channel Estimation for Fading Time–Dispersive Channels". In: IEEE transactions on vehicular technology vol. 41, No. 3, Aug. 1992, pp. 255–265.

P. A. Bello: "Characterization of Randomly Time–Variant Linear Channels". In: IRE, vol. 38, pp. 291–299, Mar., 1950.

E. Eleftheriou et al. : "Tracking Properties and Steady–State Performance of RLS Adaptive Filter Algorithms." In: IEEE Transacitons on Acoustics, Speech and Signal Processing, vol. ASSP–34, No. 5, Oct. 1986.

B. Widrow et al. : "Stationary and Nonstationary Learning Characteristics of the LMS Adaptive Filter." In: Proceedings of the IEEE, vol. 64, No. 8, Aug. 1976.

Lo et al., "channel Interpolation for Digital Mobile Radio Communications", 1991 IEEE Int'l Conf Comm, pp 773–777 1991.

*Primary Examiner*—Douglas W. Olms
*Assistant Examiner*—Matthew C. Phillips
*Attorney, Agent, or Firm*—Spencer & Frank

[57]  ABSTRACT

A method for reliability-controlled data detection of TDMA data bursts with a central test sequence for determining the identification parameters of the transmission channel, wherein: the data segments adjoining the test sequence at both ends are subdivided into N sectors $A_i$, $i=\pm 1, \ldots, \pm N$, with M sampled signal values each; in the kth processing step the sectors $A_{1+}$, $+1 \leq i^+ \leq =N$ are detected, suitable measures $\Lambda_{i-}$ and $\Lambda_{i+}$ are determined for the detection results, and the detection result of the sector whose measure of reliability has the smaller value is rejected again if by then all sectors $A_{-1}, \ldots, A_{i-1}$ and $A_{+1}, \ldots, A_{i+-1}$ have finally been processed; in the kth processing step the sector $A_{i-}$ is detected if $-N < i^- \leq -1$ and all the sectors $A_{i+}$, $+1 \leq i^+ \leq +N$ have already been processed; in the kth processing step the sector $A_{i+}$ is detected if $+1 \leq i^+ < +N$ and all the sectors $A_{i-}$, $-N \leq i^- \leq -1$ have already been processed; and the above steps are carried out until all the sectors are processed.

2 Claims, 4 Drawing Sheets

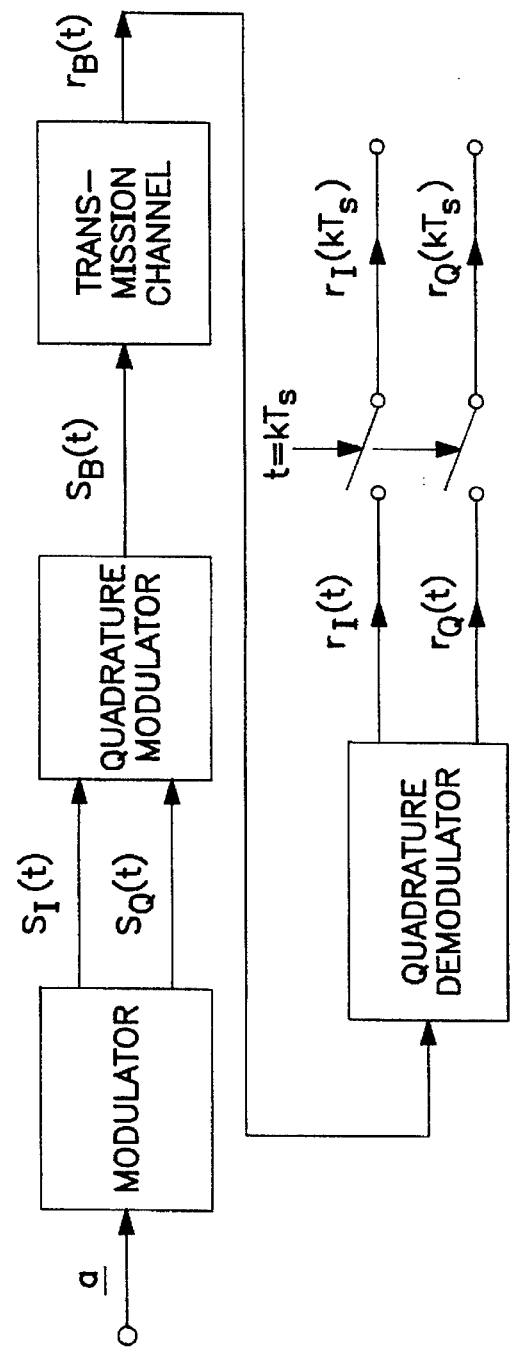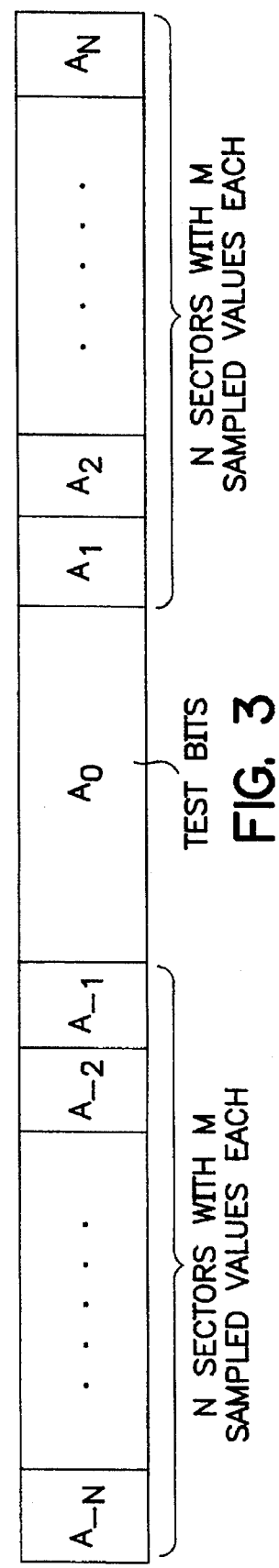

RELIABLITY-CONTROLLED DATA RECEPTION IN RECEIVERS FOR TDMA MOBILE RADIO SYSTEMS

1. BACKGROUND OF THE INVENTION

The invention relates to the problem of adaptive data detection in a mobile radio receiver. "Adaptive" means that there is provided in the receiver a device which can track the temporal changes in the characteristics of the mobile radio channel. Such devices mostly operate using the LMS (Least Mean Squares) (see [1] for example) or the RLS (Recursive Least Squares) (see [2], for example) algorithm. These algorithms adapt to the characteristics of the transmission channel continuously with time. For example, a Kalman filter for adapting the channel unit pulse response in a mobile radio receiver is described in Fifth European Signal Processing Conference, 18–21/9/1990, Barcelona, ES; elsevier, Amsterdam, NL, 1990; pages 225–228, Morgül & Dzung: "New optimum recursive parameter estimation/detection using unreliable erasure-declaring detector". In this case, the Kalman algorithm is applied only to the channel unit pulse response present at a specific instant.

EP-A-0 524 597 includes a description of an iterative method for reducing intersymbol interference, in which the value of received sample values is fixed after one or more plausibility thresholds have been passed. The intersymbol interference is suppressed with the aid of the respective deviations of the received sample values from the fixed values.

EP-A-520 969 includes a specification of an estimation method for data detection, in which received sampled values of a time slot are initially stored, starting with the value first received, and processed, specifically as far as beyond a fading dip; further processing is then performed starting with the sampled value last stored, in order to generate estimated values of the transmitted data.

It is demonstrated in this patent application that continuously adapting algorithms fail under certain conditions which are typical of mobile radio. The reason for this is that the above need adaptation algorithms can be regarded as time-variant recursive filters of the first order. Higher order algorithms exhibit a better behaviour in principle; two possible algorithms are described in [3] and [4]. A precondition for these algorithms is a reliability-controlled data detection, that is to say in a specific received signal segment the data bits are detected not in continuous sequence with time but, starting with the most reliable data bits, in the direction of decreasing reliability.

SUMMARY OF THE INVENTION

According to a first aspect of the invention, a method is provided for data detection of TDMA data bursts, which have a central test sequence ($A_0$), by determining the identification parameters of the transmission channel, wherein the following steps are carried out for one data burst in each case:

a) the two data segments between which the test sequence within the data burst is situated are respectively subdivided into N sectors;

b) a first channel unit pulse response is determined from the test sequence;

c) with the aid of the first channel unit pulse response the data of the two sectors ($A_{-1}$, $A_1$) which immediately adjoin the test sequence in the forward and reverse directions, respectively, are determined as detection results;

d) the reliability of the detection result last determined in the forward direction is compared with the reliability of the detection result last determined in the reverse direction, the less reliable detection result is rejected and the further detection direction is fixed on that forward or reverse direction which corresponds to the direction in which —viewed from the test sequence— the more reliable detection result is situated;

e) the channel unit pulse responses of all sectors are updated with the aid of the more reliable detection result;

f) with the aid of the channel unit pulse responses determined in the previously processed sectors, the detection result of the following sector is determined in the fixed detection direction and, instead of the rejected detection result, a new detection result is detected in the opposite direction on the basis of the channel unit pulse responses of the previously processed sectors; and, g) the steps d) to f) are repeated until the data of all the sectors are detected.

According to a further aspect of the invention, a method is provided for data detection of TDMA data bursts, which have a central test sequence ($A_0$), by determining the identification parameters of the transmission channel, wherein the following steps are carried out for one data burst in each case:

a) the two data segments between which the test sequence within the data burst is situated are respectively subdivided into N sectors;

b) a first channel unit pulse response is determined from the test sequence;

c) with the aid of the first channel unit pulse response the data of the two sectors ($A_{-1}$, $A_1$) which immediately adjoin the test sequence in the forward and reverse directions, respectively, are determined as detection results;

d) the reliability of the detection result last determined in the forward direction is compared with the reliability of the detection result last detected in the reverse direction and the further detection direction is fixed on that forward or reverse direction which corresponds to the direction in which—viewed from the test sequence— the more reliable detection result is situated;

e) the channel unit pulse responses of all sectors are updated with the aid of the more reliable detection result;

f) with the aid of the channel unit pulse responses determined in the previously processed sectors, the detection result of the following sector is determined in the fixed detection direction, g) the steps d) and f) are repeated until the data of all the sectors are detected in a first detection direction; and, h) the detection is continued on the other detection direction also with the aid of channel unit pulse responses which have been determined in the first detection direction.

BRIEF DESCRIPTION OF THE DRAWINGS

FIG. 1 shows the structure of data which are transmitted in bursts in a mobile radio system.

FIG. 2 is a block diagram of the transmission link.

FIG. 3 represents the division of the TDMA burst into sectors.

2. DESCRIPTION OF THE INVENTION

2.1 Model of the transmission system

Figure 4:
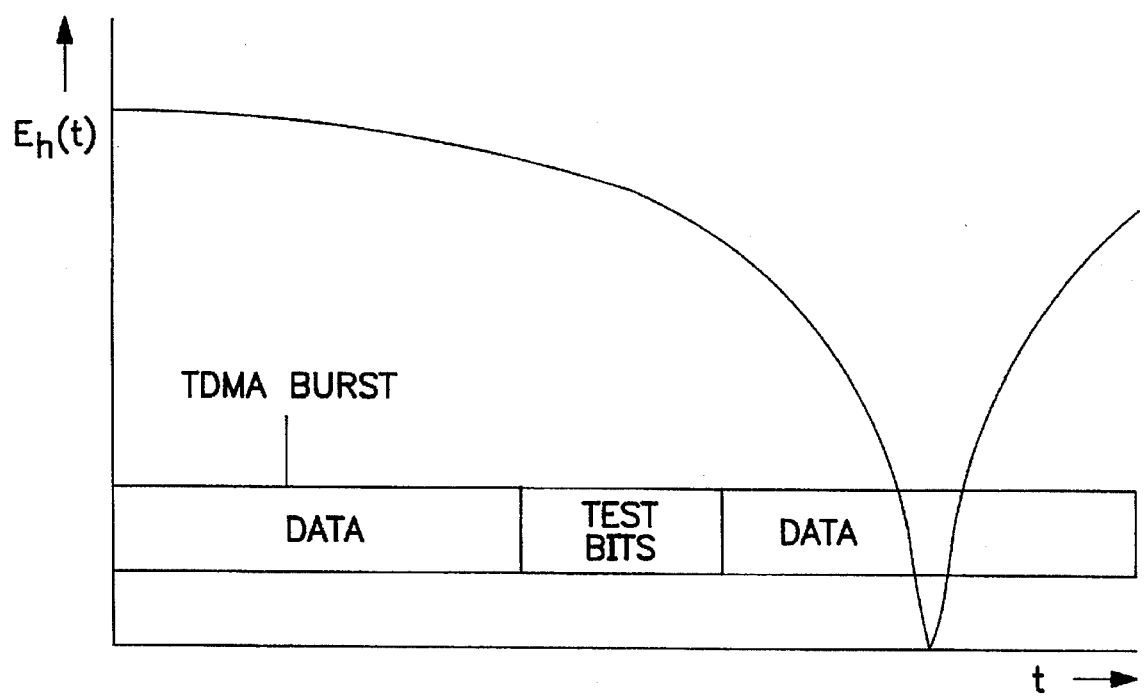
FIG. 4 shows a fading dip in a TDMA burst.
Figure 5:
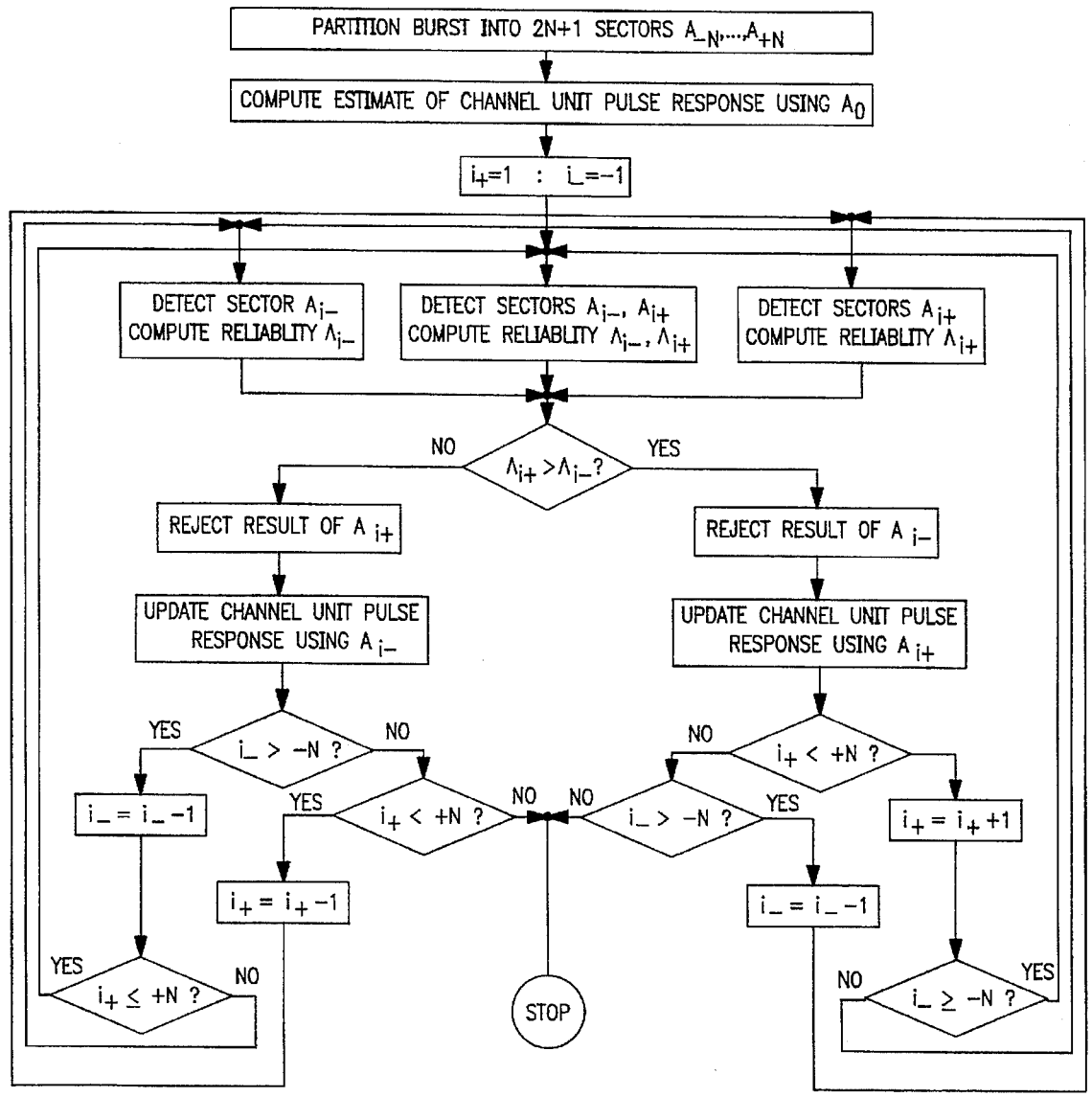
FIG. 5 is a flow chart illustrating the method according to the invention.
Figure 6:
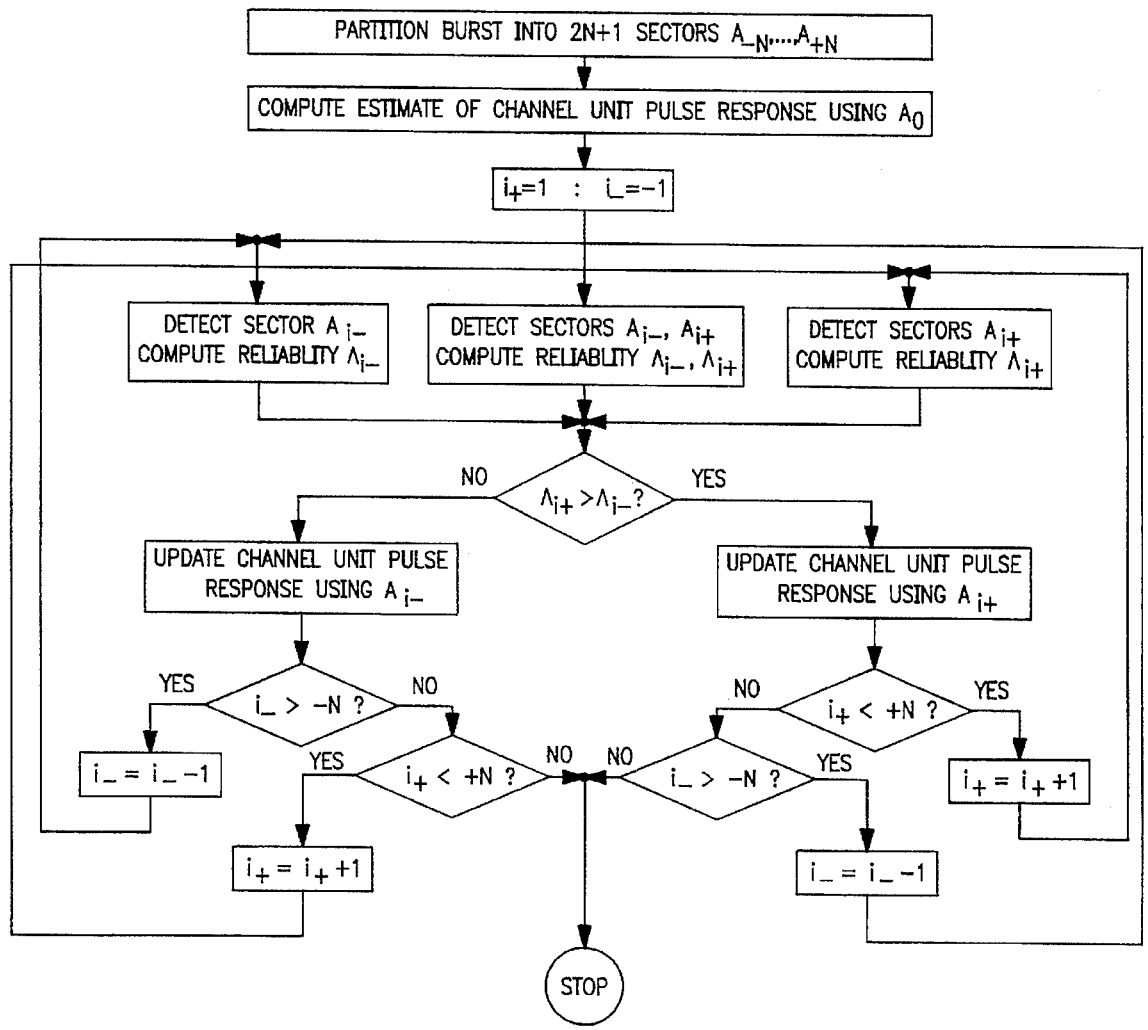
FIG. 6 is a flow chart illustrating a modification of the method according to the invention shown in FIG. 5.

Data are transmitted in bursts in digital TDMA mobile radio systems. In the GSM system, for example 116 data bits are combined to form a burst. The burst structure selected for this purpose is represented in FIG. 1. In addition to the 116 data bits, which are grouped into two segments of 58 bits each, the burst also contains at each end 3 so-called tail bits, and in the middle a so-called test sequence consisting of 26 bits, with the result that the burst consists of 148 bits in total.

The test sequence is used to "measure" the transmission channel. The latter can be described as a linear time-variant filter [5], and so the measurement of the transmission channel is equivalent to estimating the channel unit pulse response.

A measure of the rate of change of the channel is the so-called Doppler frequency $$f_d = f_0 \frac{v}{c}.$$

Here, $f_0$ is the carrier frequency of the transmitted signal, v the speed of the mobile subscriber, and c the speed of light. The length of a burst is selected such that, despite the possible changes, the channel unit pulse response can be regarded as virtually constant during a burst. In the case of GSM, this assumption holds for speeds v of up to 250 k/h (the carrier frequency $f_0$ is 900 MHz, the burst duration is approximately 546 µs).

The method according to the invention presupposes a burst transmission similar to the case of GSM. In particular, the presence of a test sequence in the middle of the burst is significant.

The parts of the transmitter and receiver important for the definition of the signals are represented in FIG. 2. The modulator images the data sequence a to be transmitted into the signal s(t). It is assumed that s(t) is a complex-valued low-pass signal having the quadrature components $s_I(t)$ and $s_Q(t)$, that is to say $$s(t) = s_I(t) + js_Q(t).$$

In this case, $j=\sqrt{-1}$ is the imaginary unit. Furthermore, it is assumed that $W_s$ is the bandwidth of the signal. s(t) can therefore be represented uniquely in accordance with the sampling theorem by means of the sampled values $s(kT_s)$ with $T_s=1/W_s \cdot s(t)$ is imaged by the quadrature modulator into the HF signal $$s_B(t) = Re\{s(t)e^{j2\pi f_0 t}\} = s_I(t)\cos 2\pi f_0 t - s_Q(t)\sin 2\pi f_0$$

$f_0$ being the desired carrier frequency. $s_B(t)$ is, if appropriate, further amplified and emitted via the antenna.

Let $r_B(t)$ be the HF received signal which, like $s_B(t)$, can, in accordance with $$r_B(t) = Re\{r(t)e^{j2\pi f_0 t}\} = r_I(t)\cos 2\pi f_0 t - r_Q(t)\sin 2\pi f_0 t$$

be assigned a complex-valued low-pass signal $$r(t) = r_I(t) + jr_Q(t)$$

The quadrature demodulator at the receiver end is used to acquire this signal. r(t) is, like s(t), a low-pass signal of bandwidth $W_s$; r(t) can therefore likewise be represented by its sampled values $r(kT_s)$.

It is assumed in mobile radio that the relationship $$r(kT_s) = \sum_l h(l,kT_s)s((k-l)T_s) + n(kT_s)$$

exists between the sampled values of the received signal and transmitted signal. The sum describes a time-discrete convolution; $h(l,kT_s)$ is the lth coefficient of the (time-variant) channel unit pulse response at the instant $t=kT_s$. $n(kT_s)$ symbolizes an additional noise component; in mobile radio, this is usually composed of thermal noise and signals from foreign transmitters.

In the following considerations, the time constant $T_s$ is always omitted from the notation; furthermore, it is assumed that the channel unit pulse response coefficient differ from zero only for $l=0, \ldots, L-1$. The above relationship between the sampled values of the received signal and transmitted signal is then as follows $$r(k) = \sum_{l=0}^{L-1} h(l,k)s(k-l) + n(k). \quad (1)$$

In order to simplify the notation, the channel unit pulse response coefficients at the time $kT_s$ are combined to form the vector $$\underline{h}(k) = (h(0,k), \ldots, h(L-1,k))^T$$

Concerning the notation: vectors are marked by an underscore. The first summand in equation (1) can be denoted as the useful component, while the second can be denoted as the noise component of the received signal.

2.2 General principle of the detection

In order to describe the method according to the invention it is important that the channel unit pulse response in the receiver must be known for the purpose of detecting the transmitted data. This follows directly from equation (1). Assuming that the noise signal were not present, that is to say n(k)=0, the received signal would depend only on the transmitted signal and the channel unit pulse response. Consequently, if the received signal and channel unit pulse response are known, equation (1) can be solved for the transmitted signal, and the transmitted data can subsequently be determined by inversion of the modulation. It holds inversely that if the data are known equation (1) can be solved for the channel unit pulse response. If $n(k) \neq 0$, no direct solution of (1) for $s(k-1)$ or $h(1,k)$ can be undertaken; nevertheless, it also holds here that the channel unit pulse response must be known in order to determine the transmitted signal, and vice versa. Because of the non-vanishing noise n(k), the detected values of the data and of the channel unit pulse response, respectively, are estimated values. The general principle of the detection is described as follows. The received burst is divided into 2N+1 sectors $A_i$, $-N \leq i \leq +N$ which do not necessarily have to be the same length. However, the length of the sectors is to be selected such that it can be assumed that the channel unit pulse response is constant within a sector. Let the sector $A_0$ be identical with the test sequence. Such a sectorization is represented in FIG. 3.

Since the test sequence is known, the channel unit pulse response can be determined for the sector $A_0$. Since the channel unit pulse responses in neighbouring sectors differ from one another only slightly, the data of the sectors $A_{-1}$ and $A_{+1}$ can be determined with the aid of the estimated value of the channel unit pulse response in sector $A_0$. These data can now be used to estimate the channel unit pulse responses of these sectors. These responses are then used in turn for the data detection of the sectors $A_{-2}$ and $A_{+2}$, etc.

The estimation of the channel unit pulse response in sector $A_i$, i>0 will be based not only on the data detected in this sector, but also, for example, on the channel unit pulse response in the sector $A_{i-1}$. The reason for this is that the channel unit pulse response vary only slightly from sector to sector; the channel unit pulse responses of the individual sectors are strongly correlated with one another.

The idea on which the invention is based consists essentially of the finding that the correlations of the channel unit pulse response coefficients are to be utilized to the greatest possible extent, that is to say, when determining the channel unit pulse response for the sector $A_i$, all the channel unit pulse responses of the sectors already processed are to be taken into account. This is appropriate, however, only if the estimated values of the channel unit pulse responses of the sectors already processed are also reliable. For this reason, the processing of the burst ought to be carried out in the direction of decreasing reliability, starting with the most reliable sector.

2.3 Previously known solutions

The best known methods for the adaptation of the channel unit pulse response are the LMS and the RLS algorithms. In both cases, the sectors outside the test sequence consist of only one sampled signal value each. Let +e,cirh+ee (i) be the estimated value of the channel unit pulse response for the ith sector. Both algorithms calculate $$+e,cir\ \hat{h}+ee\ (i) = \hat{h}(i-1) + \underline{P} + ee\ (i)d(i). \qquad (2)$$

for i>0. Here, $\underline{P}(i)$ is a vector of the same dimensions as +e,cirh(i) and $$d(i) = r(i) - \hat{r}(i) \qquad (3)$$

is the error between the actual received signal r(i) and the simulated received signal $$\hat{r}(i) = \sum_{l=0}^{L-1} \hat{h}(l, i-1)s(i-l). \qquad (4)$$

Equation (2) describes that +e,cirh+ee (i) depends only on +e,cirh+ee (i−1), that is to say the estimated channel unit pulse response in the preceding sector. The detected data are required for calculating the error d(i).

These considerations hold both for the LMS and for the RLS algorithm. The difference between the two algorithms consists in the choice of $\underline{P}(i)$. Since each new estimated value of the channel unit pulse response depends, in accordance with equation (2), only on the immediately preceding one, it is possible to speak (by analogy with the theory of recursive time-discrete filters) of algorithms of the first order.

The temporal direction in the adaptation equation (2) can be reversed. The result is then $$+e,cirh+ee\ (i) = +e,cirh+ee\ (i+1) + \underline{P}(i)d(i). \qquad (5)$$

This is important for processing the sectors $A_i < 0$.

Algorithms of the first order fail under two conditions.

1. If the estimated value for the channel unit pulse response in the sector $A_{i-1}$ is completely wrong, then the data detection in the sector $A_i$ is also defective, since this is carried out precisely using the estimated channel unit pulse response of the sector $A_{i-1}$. Since the estimated value for the channel unit pulse response in the sector $A_i$ depends only on +e,cirh+ee (i−1) and the data of the sector $A_i$, this will also be completely wrong. An erroneous estimate of the channel unit pulse response in the sector $A_{i-1}$ therefore leads with high probability to an erroneous estimate of the channel unit pulse response in this sector $A_i$.

2. If the components of the channel unit pulse response vector in the sector $A_i$ are so small that the useful component of the received signal is small with respect to the noise component, the data detection in this sector will be defective with a very high probability. It then follows from equations (2), (3) and (4) that the change in the channel unit pulse response from the sector $A_{i-1}$ to the sector $A_i$ cannot be tracked; rather, the estimated change will be completely random. It follows from this and from the small size of the components of $\underline{h}(i)$ that the estimated value +e,cirh+ee (i) is completely wrong both high probability.

It follows from the two points that the algorithms of the first order do not permit an adaptation through a fading dip. A fading dip is understood as a situation in which the channel unit pulse response coefficients assume values which are so small that the useful component of the received signal disappears in the noise. Assume that the sector $A_{i-1}$ were affected by a fading dip. It now follows from the second point that the estimated value for the channel unit pulse response in the sector $A_i$ will be strongly affected by error with high probability. It then follows from the first point that this also holds for all further sectors $A_{i+1}$, $A_{i+2}$ etc.

If a fading dip occurs in a data segment, the data downstream (as seen from the test sequence) of this fading dip are no longer detectable. The probability of such a fading dip increases with the vehicle speed. This is the reason why algorithms of the first order fail at high vehicle speeds. This statement holds in the GSM system for vehicle speeds above approximately 250 km/h.

2.4 Reliability-controlled data detection in accordance with the invention

The possibility of adapting the channel unit pulse response through a fading dip is the precondition for a reliable mobile communication at very high vehicle speeds. Examples of application in this case are quickly moving trains for which speeds of up to 500 km/h are being discussed. The GSM system was designed initially for vehicle speeds up to approximately 250 km/h. Use of the GSM standard with mobile radio on trains is possible only if it is possible for the methods for adapting the channel unit pulse response, and in particular the capacity for adapting the channel unit pulse response as through a fading dip can be significantly improved.

A significant improvement in the adaptation of the channel unit pulse response is possible only by means of higher order algorithms. With such algorithms, the estimated value +e,cirh+ee (i) depends not only on +e,cirh+ee (i−1) (or +e,cirh+ee (i−1) in the case of reverse adaptation), but on as many already detected +e,cirh+ee (i+n), n≠0, as possible. This permits improved utilization of the correlations of the channel unit pulse responses at different times.

Example: assume the situation represented in FIG. 4 to be given.

$$E_h(t) = \sum_{l=0}^{L-1} |h(l,t)|^2$$

is the energy of the channel unit pulse response at time t. A fading dip is to be seen approximately in the middle of the second data segment. In the case of the use of an algorithm of the first order which cannot be adapted through this fading dip, the data bits would no longer be detectable at the end of the second data segment. Since, however, the channel unit pulse response coefficients at both ends of the fading dip are correlated with one another, it is certainly possible to use the estimated channel unit pulse responses at the left-hand end to draw conclusions on those at the right-hand end of the fading dip. For this purpose, however, it ought to be ensured that the profile of the channel unit pulse response is completely known at the left-hand end of the fading dip before an attempt is made to determine that at the right-hand end. It is thus necessary to provide a device which firstly provides all the reliable data areas, that is to say data areas which are not affected by a fading dip, for detection before an affected area is processed.

The sectorization of the burst represented in FIG. 3 may be considered for the purpose of reliability-controlled data detection. Assume that each sector consists of M sampled signal values. Initially, the data bits of the sectors $A_{-1}$ and $A_{+1}$ are detected. In addition, a measure for the reliability of each data bit decision is determined. Let a(k) be the kth data bit and $\underline{r}$ the vector with the sampled values of the received signals as components, and let $P(a(k)=\alpha|\underline{r})$ be the posterior probability that the kth transmitted data bit has the value $\alpha$, then ideally $$\lambda(k) = \left| \ln \frac{P(a(k)=1|\underline{r})}{P(a(k)=0|\underline{r})} \right|$$

is to be used as a measure of reliability for the kth data bit division. Methods which can calculate these values (at least approximately) are generally known in statistical information theory. Let $\Lambda_i$ be the sum of all the measures of reliability in the sector $A_i$. $\Lambda_i$ will be denoted below as "reliability of sector $A_i$". After processing of $A_{-1}$ and $A_{+1}$, the detection result for the sector which has the lower reliability is rejected again. Assume this would be the sector $A_{+1}$. The detection result for the sector $A_{-1}$ then remains. In the next step, the sectors $A_{-2}$ and, again, $A_{+1}$ are then processed, a comparison of $\Lambda_{-2}$ and $\Lambda_{+1}$ is carried out and the sector with the lower reliability is rejected in turn, etc. The new detection of the rejected sector in the following step only makes sense if the selected sector has been used to carry out a channel adaptation whose result is transferred to the rejected sector by suitable extrapolation. Only in this case can the new detection of the rejected sector lead to a new result. If such an extrapolation is not carried out, the sector with the lower reliability is not rejected. The reliability comparison then supplies only the information on the direction of the further detection. In the above case, only the sector $A_{-2}$ would then be detected in the second step and its reliability $\Lambda_{-2}$ compared with $\Lambda_{+1}$.

Literature

[1] B. Widrow, J. M. McCool, M. G. Larimore, C. R. Johnson, "Stationary and Nonstationary Learning Characteristics of the LMS Adaptive Filter", Proceedings of the IEEE, vol. 64, no. 8, pp. 1151–1162, 1976.

[2] E. Eleftheriou, D. D. Falconer, "Tracking Properties and Steady-State Performance of RLS Adaptive Filter Algorithms, IEEE Transactions on Acoustic, Speech and Signal Processing, vol. ASSP-34, no. 5, pp. 1097–1110, 1986.

[3] G. J. Hagmanns, "Kalman-Filter zur Kanalstoβantwort-adaption in Empfängern für TDMA-Mobilfunksysteme" ("Kalman filters for channel unit pulse response adaptation in receivers for TDMA mobile radio systems"), International Patent Application WO 94/24798.

[4] F. J. Hagmanns, "Geradeninterpolationsmethode zur Kanalstoβantwortadaption in Empfängern für TDMAM-Mobilfunksysteme" ("Rectilinear interpolation methods for channel unit pulse response adaptation in receivers for TDMA mobile radio systems"), International Patent Application WO 94/24796.

[5] P. A. Bello, "Characterization of Randomly Time-Variant Linear Channels", IEEE Transactions on Communications Systems, vol. CS-11, pp. 360–393, 1963.

I claim:

1. A method for data detection of TDMA data bursts, which have a central test sequence ($A_0$), by determining the identification parameters of the transmission channel, wherein the following steps are carried out for one data burst in each case:

a) the two data segments between which the test sequence within the data burst is situated are respectively subdivided into N sectors;

b) a first channel unit pulse response is determined from the test sequence;

c) with the aid of the first channel unit pulse response, the data of the two sectors ($A_{-1}$, $A_1$) which immediately adjoin the test sequence in the forward and reverse directions, respectively, are determined as detection results;

d) the reliability of the detection result last determined in the forward direction is compared with the reliability of the detection result last determined in the reverse direction, the less reliable detection result is rejected and the further detection direction is fixed on that forward or reverse direction which corresponds to the direction in which —viewed from the test sequence— the more reliable detection result is situated;

e) the channel unit pulse responses of all sectors are updated with the aid of the more reliable detection result;

f) with the aid of the channel unit pulse responses determined in the previously processed sectors, the detection result of the following sector is determined in the fixed detection direction and, instead of the rejected detection result, a new detection result is detected in the opposite direction on the basis of the channel unit pulse responses of the previously processed sectors; and, g) the steps d) to f) are repeated until the data of all the sectors are detected.

2. A method for data detection of TDMA data bursts, which have a central test sequence ($A_0$), by determining the identification parameters of the transmission channel, wherein the following steps are carried out for one data burst in each case:

a) the two data segments between which the test sequence within the data burst is situated are respectively subdivided into N sectors;

b) a first channel unit pulse response is determined from the test sequence;

c) with the aid of the first channel unit pulse response, the data of the two sectors ($A_{-1}$, $A_1$) which immediately adjoin the test sequence in the forward and reverse directions, respectively, are determined as detection results;

d) the reliability of the detection result last determined in the forward direction is compared with the reliability of the detection result last detected in the reverse direction and the further detection direction is fixed on that forward or reverse direction which corresponds to the direction in which—viewed from the test sequence— the more reliable detection result is situated;

e) the channel unit pulse responses of all sectors are updated with the aid of the more reliable detection result;

f) with the aid of the channel unit pulse responses determined in the previously processed sectors, the detection result of the following sector is determined in the fixed detection direction;

g) the steps d) and f) are repeated until the data of all the sectors are detected in a first detection direction; and, h) the detection is continued on the other detection direction also with the aid of channel unit pulse responses which have been determined in the first detection direction.

* * * * *